June 12, 1934.  A. LESAGE  1,962,247
MULTIPLE DISK CLUTCH
Filed Aug. 5, 1932  3 Sheets-Sheet 1
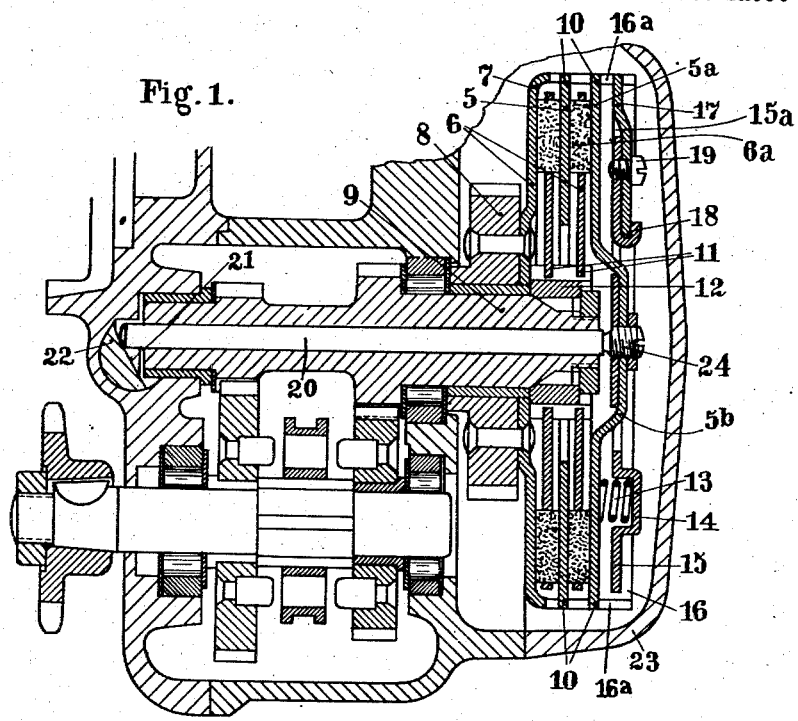
Inventor
Alfred Lesage
By Dean, Fairbank, Hinsch & Foster
Attorneys June 12, 1934.    A. LESAGE    1,962,247
MULTIPLE DISK CLUTCH
Filed Aug. 5, 1932    3 Sheets-Sheet 3

Inventor
Alfred Lesage

Patented June 12, 1934

1,962,247

UNITED STATES PATENT OFFICE 1,962,247

MULTIPLE DISK CLUTCH

Alfred Lesage, Schweinfurt, Germany

Application August 5, 1932, Serial No. 627,557
In Germany August 5, 1931

5 Claims. (Cl. 192—63)

The invention relates to a disk clutch and more particularly to a clutch of this kind intended in connection with a change speed gear for the transmission of the drive in motor cycles.

The object of the invention is to devise a disk clutch of small volume and flat construction adapted to be placed in the gear case, the disks being assembled in a dish shaped shell and secured therein by a cover attached to the shell by means of special fastening devices.

A further object is to provide an appliance permitting the ready disengagement of the clutch and its co-operation with the clutch.

The subject matter of the invention resides in the special arrangement of an abutment disk receiving the thrust of the springs automatically engaging the clutch, and the means for fastening said abutment disk to the clutch shell.

Several embodiments of the invention are illustrated by way of example in the annexed drawings, which form a part of this specification and in which—

Figure 7:
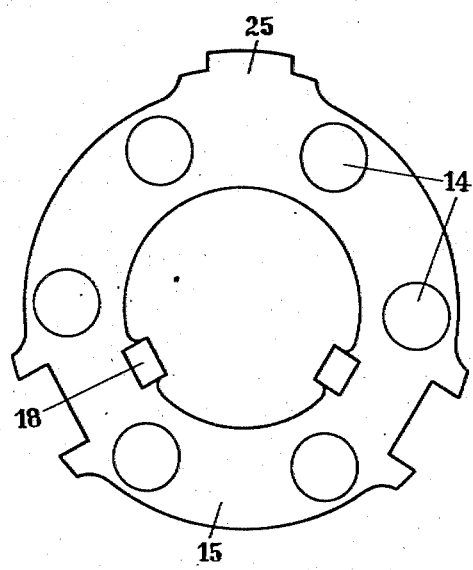
Figures 8, 9:
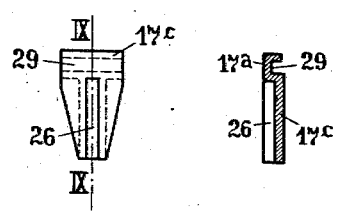

Fig. 1 is an axial sectional elevation of a change speed gear combined with the disk clutch according to the invention, Fig. 2 is the end view of the clutch, Fig. 3 shows the circumference of the clutch shell and the operating parts located therein, Fig. 4 is a sectional view of another embodiment of the invention, Figs. 5 and 6 are partial end and lateral views, Fig. 7 is an elevational view of a modification of the abutment disk, and Figs. 8 and 9 are, respectively, a front elevation and a section on the line IX—IX of a modification of the key plates.

Like numerals denote like parts throughout all figures of the drawings.

Referring to Fig. 1, the numeral 7 denotes the box or shell of the disk clutch. It encloses the two alternating sets 5 and 6 of friction disks and is connected to a pinion 8 which is rotatably mounted on a shaft 9 of the transmission change speed gear. Only a limited number of disks is shown in the laminated clutch; but any desired number thereof can be employed. The disks 6 provided with friction material 6a engage by projections 11 extending inwards with longitudinal grooves arranged on the circumference of a sleeve 12 which is fastened to the shaft 9 in a suitable way so as to be prevented from being revoluble thereon. On their outer edge the disk 5 and the end disk 5a are provided with projections 10 which engage with axial slots 16a provided therefor in the circumferential flange 16 of the shell body 7. The disks 5 and 6 may therefore move in an axial direction with respect to each other. The outside disk 5a fastened to the flange 16 is pressed in the direction of the bottom 7 of the shell by springs 13 distributed around the shaft and guided within caps 14 which are stamped or otherwise formed in a flat abutment disk 15 or attached thereto. The said disk is recessed in the centre and rigidly fastened to the circumferential flange 16 by key or locking pieces 17 attached to it and engaging like latches with notches 16b provided in the lateral edges of the slots 16a of the said flange 16, thus preventing axial and rotary movements of the said disk 15 (Fig. 3). These locking pieces 17 are placed with their outer offset ends in recesses 15a of the disk 15 while their inner ends engage with mouldings or lugs 18 turned back from the inside edge of the disk 15. Screws 19 passing through holes of the middle part of the pieces 17 hold them against lateral movement, but will allow their ready attachment or removal. Three locking pieces 17 are shown for example, but evidently any desired number thereof may be employed.

The outside clutch disk 5a extends with its central cup-shaped part 5b into the central recess of the disk 15 and has in its central bore a stop screw 24 to be locked by a check nut and the inner end of which bears against the adjacent end of a pin 20 which is movable within the longitudinal bore of the shaft 9. The other end of the pin 20 bears against the flat portion 21 of a gudgeon 22 mounted in the gear case at right angles to the pin 20 and susceptible of being rotated by the driver by means of a suitable transmission device.

In the position shown by the drawings the said gudgeon is in its neutral position. The clutch is kept closed by the springs 13 pressing the friction bodies 6a and disks 5 and 5a against each other. When however the gudgeon 22 is turned clockwise about its axis, the pin 20 is pushed by the flat portion 21 to the right and during this movement it displaces the disk 5a in the same direction against the pressure of the springs 13. Consequently the two sets of disks will be released from the pressure and enabled to freely rotate with respect to each other.

Referring to Figs. 4, 5 and 6, the construction of the friction clutch and gear is similar to that described in connection with Figs. 1 to 3, while the locking pieces 17 are modified in order to dispense with the screws 19 which may become unlocked inadvertently. To attain the desired reliable connection, the outer end of each of the locking pieces is provided with a rearwardly extending boss or projection 17a the front of which is grooved at 29 as will be best seen from Figs. 4 and 5. The axial width of the notches 16b is such that the boss 17a can be inserted into them from the interior of the flange 16, whereupon the springs 13 acting upon the abutment disk 15 will engage the fore part of the flange 16 with the groove 29 as represented in the upper part of Figs. 4, 5 and 6, the boss being held in the recesses 15a and preventing the disk 15 from rotation in the shell. The inner ends of the locking pieces 17 are again embraced and fixed upon the disk 15 by the lugs 18. The groove 29 and the recesses 16b constitute a sort of bayonet-joint.

In the modification of the abutment disk 15 illustrated in Fig. 7, at one of the locking places of this disk a broad lug 25 is formed adapted to be engaged with the recesses 16b of a slot 16a, the other fastening means being devised as disclosed herebefore.

In Figs. 8 and 9 a locking piece 17c is shown stamped out and pressed from sheet metal, thereby being formed with a groove 29 and a central hollow rib or brace 26 for strengthening purposes.

What I claim is—

1. In a multiple disk clutch, the combination with a shaft, a shell, and friction disks alternately connected with the shaft and the shell, of an abutment disk, locking pieces attached to the abutment disk and engaging the clutch shell so as to interconnect said abutment disk with the clutch shell, and springs interposed between the friction disks and the abutment disk and adapted to hold the locking pieces in engagement with the clutch shell.

2. In a multiple disk clutch, the combination with a shaft, a shell, and friction disks alternately connected with the shaft and the shell, of an abutment disk, locking pieces removably attached to the abutment disk and adapted to engage with the clutch shell, and springs capable of interengaging the friction disks and holding the locking pieces in engagement with the clutch shell.

3. In a multiple disk clutch, the combination with a shaft, of a shell having a flange, a central bearing sleeve, a plurality of friction disks alternately provided wtih outer and inner projections engaged with slots provided in said flange and with grooves of the central bearing sleeve, respectively, an abutment disk located in the clutch shell, springs interposed between the friction disks and the abutment disk, and locking pieces removably attached to the abutment disk and projecting into the slots of said flange and engaging locking appliances disposed therein.

4. A multiple disk clutch arranged in a clutch shell, having springs adapted to hold the clutch in engagement, the combination with an abutment appliance for the springs, comprising an abutment disk and anchor plates removably attached to the abutment disk, interconnecting means of a sort of bayonet-joint being provided upon the clutch shell and the anchor plates which are held in engagement by the springs.

5. A multiple disk clutch having a shell presenting recesses, a plurality of alternating friction disks arranged within said shell, an abutment disk having recesses at its outer edge, lugs at its inner edge, and locking pieces engaging the recesses of said abutment disk and extending into the recesses of said shell and also engaging with said lugs.

ALFRED LESAGE.